Dec. 3, 1963  P. M. PANKRATZ ETAL  3,112,527
ADJUSTABLE FLEXIBLE ORIFICE FOR EXTRUSION OF FOAM PLASTICS
Filed Sept. 27, 1961  2 Sheets-Sheet 1
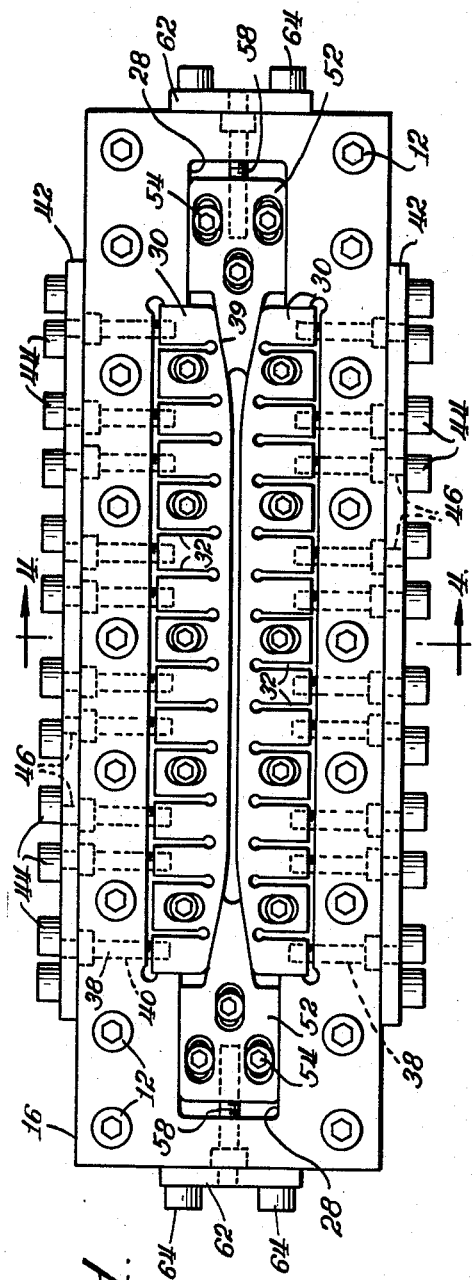
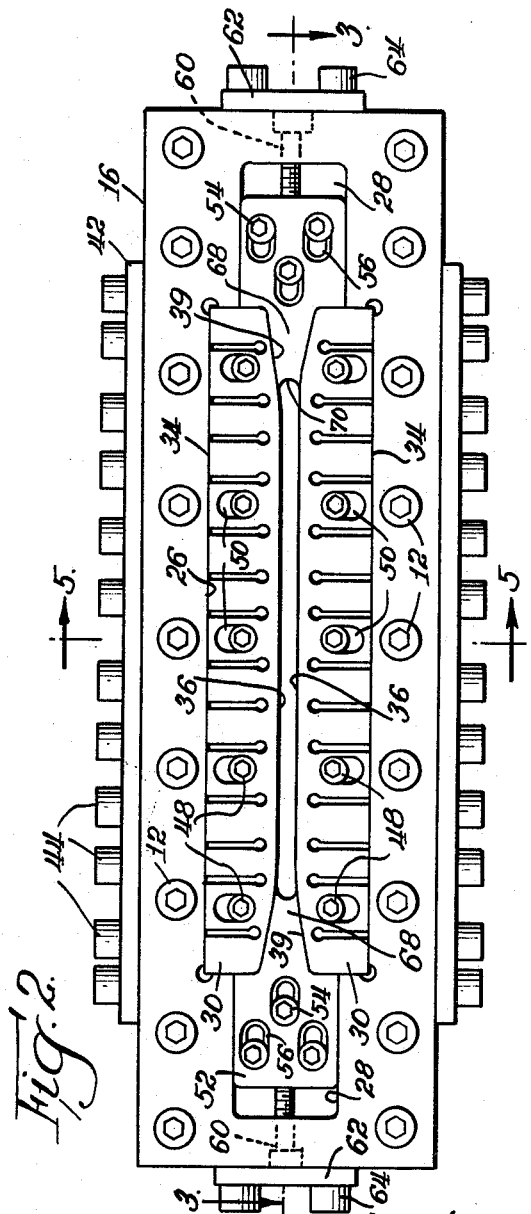
Inventors
Paul M. Pankratz,
Henry C. Houvener and
Rudolph H. Matthias
BY
Stephen J. Rudy
Jerome Rudy
Att'ys.

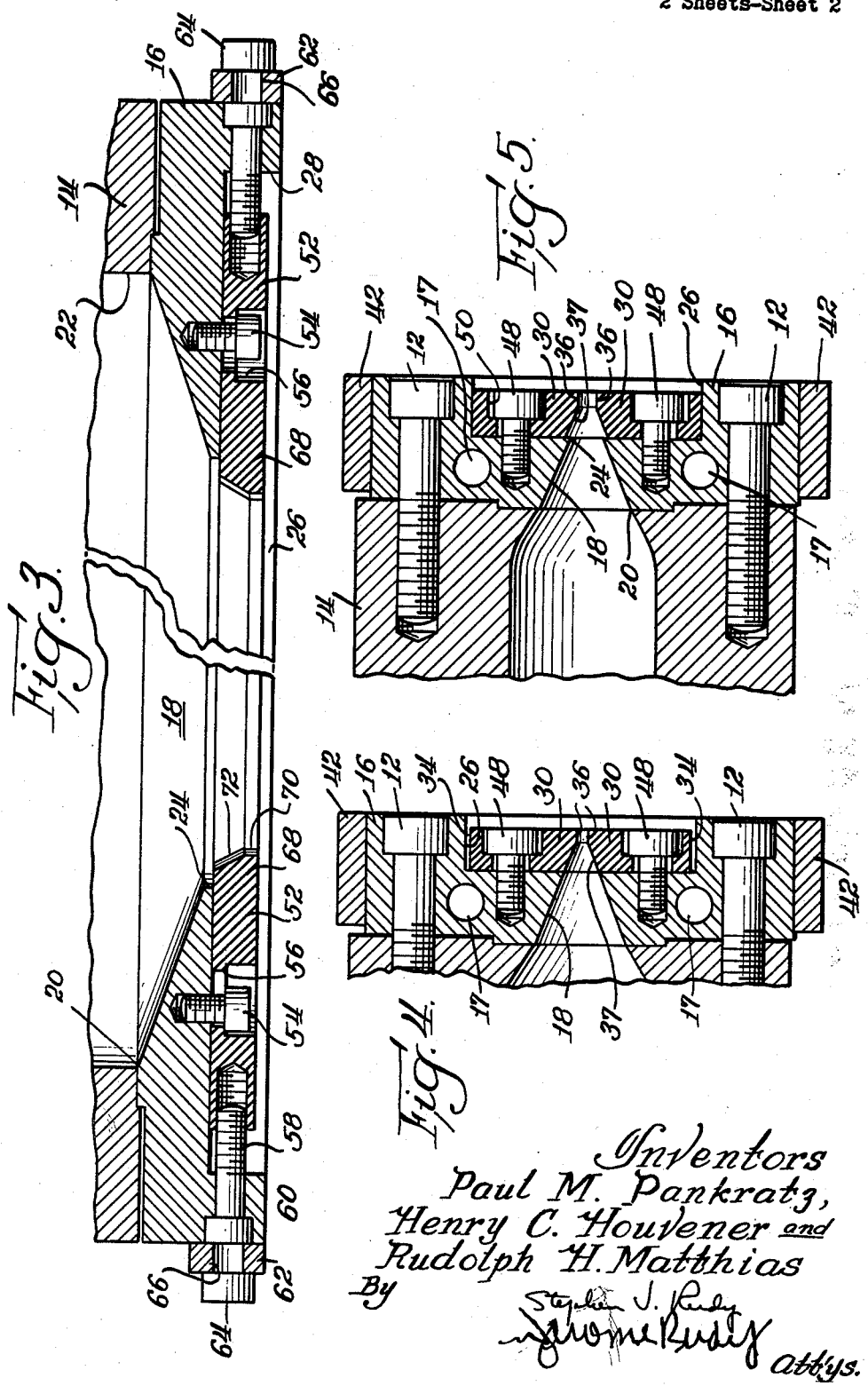

United States Patent Office 3,112,527
Patented Dec. 3, 1963

3,112,527
ADJUSTABLE FLEXIBLE ORIFICE FOR EXTRUSION OF FOAM PLASTICS
Paul M. Pankratz, Midland, Henry C. Houvener, Bay City, and Rudolph H. Matthias, Saginaw, Mich., assignors to The Dow Chemical Company, Midland, Mich., a corporation of Delaware
Filed Sept. 27, 1961, Ser. No. 141,165
5 Claims. (Cl. 18—12)

This invention relates to an improvement in orifices for extruding thermoplastic materials, and more particularly to an adjustable flexible orifice for the extrusion of foam plastics.

The general practice in the art of extruding plank like plastic forms, prior to this invention, was to use a fixed orifice. With such an orifice, no appreciable adjustment of plank size is possible without a plant shutdown and fabrication of a new orifice.

The adjustable orifice of the present invention permits adjustment of orifice size without the necessity of a plant shutdown, or fabrication of a new orifice, and also permits selective adjustment of extrusion size in localized regions of the orifice.

Briefly, the inventive concept involves the use of a pair of elongated orifice side plates which are made flexible along a longitudinal axis by providing parallel arranged slots in each plate. Adjustment means in the form of cap screws may be used to adjust the distance between the edges of the plates to thus regulate thickness of a flat sheet extrudate. Adjustable orifice end plates are provided for regulation of the width of the extruded sheet. The disclosed assemblage provides for convenient and accurate control of extrudate dimensions, and may also be used to effect adjustment on curved surfaces.

The main object is to provide an improvement in orifices for extruding thermoplastic materials.

A more specific object is to provide an adjustable orifice for the extrusion of foam plastics whereby the dimension and form of the orifice may be regulated.

Still another object of the invention is to provide an orifice for extrusion of thermoplastic which allows for adjustment of extrudate size without plant shutdown, or fabrication of a new orifice.

Still another object is to provide an orifice which may be adjusted to vary extrudate dimension in a simple and rapid manner.

These and further objects and features of the invention will become more apparent from the following description and accompanying drawings wherein:

FIG. 1 is a front view of an adjustable orifice illustrative of an embodiment of the invention;

FIG. 2 is the same (minus broken lines) but illustrating the position of various movable parts after a slot adjustment has been made;

FIG. 3 is an enlarged fragmentary section view as seen along line 3—3 in FIG. 2;

FIG. 4 is an enlarged section view as seen along line 4—4 in FIG. 1; and

FIG. 5 is an enlarged section view as seen along line 5—5 in FIG. 5.

Referring now to the drawings, an extruder die head assemblage 10 is illustrated, which may be affixed by fastening means, such as cap screws 12, to an outlet end 14 (a portion shown) of an extruder, or pump, for molten thermoplastic material.

An extruder head assemblage 10 includes a die block 16 having a longitudinal opening, or orifice 18 formed therein. Horizontally arranged internal passageways 17 may be provided to accommodate means (i.e., heated liquid, electrical resistance heater, etc., to regulate block temperature). The orifice 18 tapers from a maximum periphery 20 on the rear surface, which generally conforms to the size and shape of an extruder outlet opening 22, to a minimum periphery 24 on the opposite, or front surface.

An elongated recess 26 is formed on the outside surface of the die block 16, the longitudinal axis of the recess coinciding with that of the orifice 18. Each end portion of the recess 26 is of reduced width to provide a cavity 28. A pair of adjustable side orifice plates 30, are arranged in the recess 26. Each plate 30 is formed with a plurality of parallel arranged slots 32 (fourteen in number) which extend at right angles from an edge 34 of the plate and terminate a short distance from the opposite edge 36. A slight taper 37 is provided on the inner end of the edge 36, while the end portions are formed to provide a taper 39. The slots 32 provide a certain degree of flexibility of each plate to allow bending along the length thereof in the direction of the side edges 34 and 36.

To adjust the distance between the adjacent inner edge 36 of the orifice plate 30, adjusting means in the form of a plurality of cap screws 38 extend through smooth bore holes 40 provided in the block 16, which screws 38 are threadably affixed in the plate 30. A keeper plate 42 is secured to each side surface of the block 16 by fastening means, such as cap screws 44. A plurality of holes 46 are formed in each plate 42, which holes are of less diameter than the head of each screw 38, but which allow insertion of a wrench (not shown) into the screw heads for rotary movement thereof.

It will be seen, that with such an arrangement the screw 38 may be used to adjust the distance between the adjacent inner edges 36 of the plates 30 to provide either a uniform gap, or one of varying width. In such manner, molten thermoplastic material, being extruded in sheet form from the orifice 18, may be regulated in thickness throughout the width thereof.

To assure maintenance of any given orifice plate adjustment, holding means in the form of a plurality of cap screws 48 are arranged to extend through vertically slotted holes 50 formed in the plates 30, and to threadably the die block 16.

A pair of end adjustment orifice plates 52 are provided for regulating the width of a flat sheet of material to be extruded. Each orifice plate 52 is arranged in a cavity 28 for horizontal sliding movement, and is maintained in adjusted position therein by holding means in the form of three cap screws 54 which extend through horizontally slotted holes 56, to threadably engage the die block 16. Adjustment of each orifice plate 52 is effected by adjusting means in the form of a cap screw 58, which extends through a smooth bore hole 60 formed in the die block, and is in threaded engagement with the orifice plate. A keeper plate 62, secured to the die block by cap screws 64, is arranged to cover each cap screw 58. A hole 66 is formed in each keeper plate, which hole is of less diameter than the head of a cap screw 58, but which allows insertion of a wrench (not shown) into the screw head for rotary movement thereof.

A tapered portion 68 is formed at the inner end of each adjustment orifice plate 52, the tapered edges thereof being arranged for sliding engagement with the tapered edges 39 of an adjacent orifice plate 30. The end of each tapered portion 68 is provided with a semi-circular groove 70 while the inner edge of the tapered portion is provided with a taper 72, as best seen in FIG. 3.

In operation, the orifice plates 30 and 52 are adjusted to provide the desired thickness of thermoplastic material being extruded through the orifice 18. As mentioned hereinbefore, the longitudinal flexibility of the plates 30 allows for selective adjustment along any portion thereof by manipulation of the cap screws 44. Concurrently, horizontal adjustment of the end orifice plates 52 may be made to regulate the width of the sheet being extruded. In this connection, it may be noted that combined shape of the tapered edges 39 of the plates 30, together with the shape of the semi-circular groove 70, will provide a bead-like edge on the sheet being extruded. Such a bead-like edge can function, not only as a strengthening means for the sheet, but may provide more uniform wrapping possibilities since any minor irregularities in sheet thickness will be nullified by the greater thickness of the bead-like edge.

It will be seen that the extruder head assemblage 10 will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. A thermoplastic material extrusion die assemblage comprising in combination, a die block formed to provide an elongated recess and being further formed to provide an elongated orifice in the mid-region of the recess, a pair of side orifice plates positioned in the recess which plates are movable relative to each other to regulate the thickness of a sheet of material extruded through said orifice, said orifice plates being formed with a plurality of parallel arranged slots extending from one edge to provide flexibility along a longitudinal axis whereby selective adjustment of the distance between the edges of said plates along any point thereof may be made said side orifice plates having tapered portions at each end region, a pair of end orifice plates positioned in the recess which plates are movable relative to each other to regulate the width of a sheet of material extruded through said orifice, adjusting means to positionally adjust said plates, and holding means to maintain said plates in adjusted position.

2. A thermoplastic material extrusion die assemblage according to claim 1 wherein, said end orifice plates each have a tapered portion the sides of which slidingly engage the tapered portions of adjacent side orifice plates.

3. A thermoplastic material extrusion die assemblage according to claim 1 wherein, said adjusting means comprises a plurality of cap screws which pass through holes formed in the die block and are threadably engaged with said orifice plates.

4. A thermoplastic material extrusion die assemblage according to claim 3 wherein, a keeper plate is arranged in association with each orifice plate and is removably affixed to the die block, each of said keeper plates being formed to provide a hole in axial alignment with each cap screw but of smaller diameter than the diameter of the head of each cap screw whereby a tool may be inserted through the keeper plate into a cap screw for rotation thereof.

5. A thermoplastic material extrusion die assemblage according to claim 1 wherein said holding means comprises a plurality of cap screws which pass through slotted holes formed in said orifice plates and are threadably engaged with said die block.

References Cited in the file of this patent

UNITED STATES PATENTS

| | | |
|---|---|---|
| 1,350,722 | Goodenberger | Aug. 24, 1920 |
| 2,387,718 | Coleman | Oct. 30, 1945 |
| 2,479,804 | Bailey et al. | Aug. 23, 1949 |
| 2,628,386 | Tornberg | Feb. 17, 1953 |
| 2,686,931 | Knox | Aug. 24, 1954 |
| 2,760,227 | Andy | Aug. 28, 1956 |
| 2,859,475 | Tornberg | Nov. 11, 1958 |
| 2,963,741 | Longstreth et al. | Dec. 13, 1960 |
| 2,998,624 | Ricketts | Sept. 5, 1961 |